(12) United States Patent
Shiono et al.

(10) Patent No.: US 7,898,925 B2
(45) Date of Patent: Mar. 1, 2011

(54) INFORMATION RECORDING MEDIUM AND OPTICAL INFORMATION RECORDING/REPRODUCING APPARATUS

(75) Inventors: Teruhiro Shiono, Osaka (JP); Tatsuo Itoh, Osaka (JP); Seiji Nishino, Osaka (JP)

(73) Assignee: Panasonic Corporation, Osaka (JP)

( * ) Notice: Subject to any disclaimer, the term of this patent is extended or adjusted under 35 U.S.C. 154(b) by 894 days.

(21) Appl. No.: 11/667,765

(22) PCT Filed: Nov. 8, 2005

(86) PCT No.: PCT/JP2005/020409
§ 371 (c)(1),
(2), (4) Date: May 15, 2007

(87) PCT Pub. No.: WO2006/051765
PCT Pub. Date: May 18, 2006

(65) Prior Publication Data
US 2008/0130458 A1    Jun. 5, 2008

(30) Foreign Application Priority Data
Nov. 15, 2004   (JP) ................................. 2004-330211

(51) Int. Cl.
*G11B 7/00* (2006.01)
(52) U.S. Cl. ......................................... 369/103; 369/97
(58) Field of Classification Search .................. 369/103, 369/97, 275.3, 47.1, 47.27
See application file for complete search history.

(56) References Cited

U.S. PATENT DOCUMENTS

| 7,206,108 | B2 * | 4/2007 | Tsukagoshi | 359/35 |
| 7,321,541 | B2 * | 1/2008 | Horimai | 369/103 |
| 7,359,306 | B2 * | 4/2008 | Matsumoto et al. | 369/103 |
| 7,626,913 | B2 * | 12/2009 | Usami | 369/103 |
| 2008/0316555 | A1 | 12/2008 | Kaneko et al. | |

FOREIGN PATENT DOCUMENTS

| JP | 2002-117581 | 4/2002 |
| JP | 2004-149501 | 5/2004 |
| JP | 2004-213705 | 7/2004 |
| JP | 2007-102185 | 4/2007 |
| WO | 2006/114835 | 11/2006 |

OTHER PUBLICATIONS

Japanese Office Action issued Dec. 22, 2009 in Application No. 2006-544883.
Y. Kawata et al., "Three-dimensional optical memory using an organic multilayered medium", Proceedings for Optics Japan 2000, pp. 95-96 along with an English Abstract.

* cited by examiner

*Primary Examiner* — Nabil Z Hindi
(74) *Attorney, Agent, or Firm* — Wenderoth, Lind & Ponack, L.L.P.

(57) ABSTRACT

An information recording medium includes a substrate and a recording portion having recording layers on the substrate, wherein the recording portion is capable of three-dimensional recording by changing an optical constant of the recording layers by irradiation of recording light, and a first reflected-light reducing portion for reducing reflected lights of reproducing light from the substrate side is provided at a side opposite to an incident side of the reproducing light with respect to the recording portion, and an optical information recording/reproducing apparatus records and reproduces information to and from the medium.

29 Claims, 8 Drawing Sheets

INFORMATION RECORDING MEDIUM AND OPTICAL INFORMATION RECORDING/REPRODUCING APPARATUS

BACKGROUND OF THE INVENTION

I. Technical Field

The invention relates to an information recording medium capable of three-dimensionally recording a recording pit and an optical information recording/reproducing apparatus for recording information to and reproducing information from this medium. Particularly, the invention relates to an information recording medium and an optical information recording/reproducing apparatus capable of reproducing information from recording layers at satisfactory SN ratios.

II. Description of Related Art

Optical disks such as CDs (compact disks) and DVDs (digital versatile disks), optical card memories and the like are used as optical information recording media.

Prior Art (Yoshimasa Kawata et. al.: "Three-dimensional optical memory using an organic multilayered medium", Optics Japan 2000 Extended Abstract, pp 95-96 (2000)) discloses an information recording medium in which a plurality of recording layers 101 are three-dimensionally laminated as shown in FIG. 8 in order to realize the larger capacity of recorded information.

This information recording medium 114 includes a recording portion 103 atop a transparent substrate 109 made of glass, wherein recording layers 101a to 101d made of an urethane-urea copolymer material, which is a photon-mode recording material, and intermediate layers 102a to 102c made of a PVA (polyvinyl alcohol) film and a PMMA (polymethyl methacrylate) film are alternatively laminated.

In the information recording medium 114, a pulsed laser beam having a pulse width of about 100 femtoseconds and a high peak power is, for example, focused as a recording light 107 on the desired recording layer 101c by an objective lens 106 to record information. When the recording light 107 is focused on the recording layer 101, absorption occurs as if the wavelength of an irradiated light became a half only at a portion (focal point) with a high power density of the light by the two-photon absorption process, which is one of nonlinear absorption phenomena, whereby a recording pit 105 is written. Accordingly, the attenuation of the recording light can be suppressed since the two-photon absorption occurs only at the focal point even if there are a lot of recording layers, wherefore sufficient recording can be carried out even at the lower recording layers.

On the other hand, upon reproduction, a recording light 107 with low power is focused at the recording pit 105, and a reflected light 108 for reproduction is detected by a light detector (not shown) via the objective lens 106, whereby a signal is reproduced.

Since a plurality of recording layers 101 in which the recording pit 105 is recorded are three-dimensionally laminated in a direction of an optical axis (z-axis direction) of the objective lens 106 as described above, three-dimensional recording can be carried out in the recording portion 103, thereby increasing the information capacity.

However, the conventional information recording medium 114 whose information capacity is increased by three-dimensionally laminating a plurality of recording layers in the optical axis direction (z-axis direction) cannot provide a sufficient intensity of the reflected light 108 for reproduction if the number of the recording layers is large. Specifically, the attenuation of the light in the optical axis direction is increased if the number of the recording layers is large, wherefore no sufficient reflectivity of the reproducing light can be obtained in the lower recording layers. Since an increase in the reflectivity of the recording light at the recording layers leads to a reduction in the transmission amount of the reproducing light, the reproducing light cannot be sufficiently irradiated to the lower recording layers if the reflectivity of the reproducing light at the upper recording layers is increased. Thus, it is difficult to increase the reflectivity at the recording layers in order to increase the intensity of the reflected light 108 for reproduction from the recording pit 105. In the conventional information recording medium capable of three-dimensional recording, the reflectivity of the reproducing light was, for example, a small value of 0.1 to 1%.

Unlike CDs, DVDs and like disks, no metal reflection film is formed between the transparent substrate 109 and the recording portion 103 in this type of information recording medium capable of three-dimensional recording. This is for the following reason. Since the reflectivity of the reproducing light is low in the information recording medium capable of three-dimensional recording, if a light having transmitted through the recording portion is reflected by the metal reflecting film, it turns into stray light to reduce an SN ratio of the reproduced signal.

Accordingly, part of a transmitted light 110 having transmitted through the recording portion 103 provided with a plurality of recording layers 101 turns into various reflected lights 111 from a substrate side as shown in FIG. 8. For example, a light 110a having about 80% of the power of an incident light enters the transparent substrate 109. Then, a light having about 96% of the power of the light 110a (77% of the incident light) turns into a transmitted light 112a to transmit in the air, but the remaining light of about 4% (3% of the incident light) is reflected by an underside 113 of the transparent substrate 109 (reflected light 111a). Part of the reflected light 111a has a high possibility of passing through the recording layers 101 to be detected by the light detector via the objective lens 106. Since the reflected light 111a from the substrate contains no information, it turns into stray light that is so-called noise light. Accordingly, the reflected light other than the expected reflected light from the medium is detected as the stray light by the light detector, and the SN ratio of the reproduced signal tends to decrease since an amount of the reflected light 108 for reproduction from the recording pit 105 is small in the information recording medium 114 capable of three-dimensional recording as described above.

Out of the light having passed through the recording layers 101, for example, an oblique light 110b also enters the transparent substrate 109. The oblique light 110b is reflected by the underside 113 of the transparent substrate 109 to turn into a reflected light 111b from the substrate side, part of which is refracted, diffracted or multiply reflected by the recording pit 105 in a plurality of recording layers 101 to change its advancing direction, and is detected as stray light by the light detector via the objective lens 106. Such stray light tends to reduce the SN ratio of the reproduced signal.

Further, the incident light having passed through the recording portion 103 is, for example, partly reflected at an interface between the recording portion 103 and the transparent substrate 109 to create a reflected light 111c similar to the reflected light 111b. Since this reflected light 111c from the substrate side contains no signal as well, it turns into stray light.

Furthermore, the transmitted light 112a having transmitted through the medium advances toward the optical information recording/reproducing apparatus facing the medium. Part of this transmitted light 112a enters the medium again by being reflected by a surface of the apparatus facing the medium, and detected as a stray light.

SUMMARY OF THE INVENTION

The invention was developed to solve the problems residing in the prior art, and an object thereof is to provide an information recording medium and an optical information recording/reproducing apparatus capable of three-dimensionally recording a recording pit, particularly an information recording medium and an optical information recording/reproducing apparatus capable of reproducing information from recording layers at satisfactory SN ratios.

One aspect of the invention is directed to an information recording medium, comprising a substrate; a recording portion formed on the substrate and including a recording layer; and a first reflected-light reducing portion for reducing a reflected light of a reproducing light from a substrate side, wherein the recording portion is capable of three-dimensionally recording a recording pit by changing an optical constant of the recording layer by an irradiation of a recording light, and the first reflected-light reducing portion is formed at a side opposite to an incident side of the reproducing light with respect to the recording portion.

Another aspect of the invention is directed to an optical information recording/reproducing apparatus for recording information to and reproducing information from an information recording medium including a recording portion capable of three-dimensionally recording a recording pit by changing an optical constant of a recording layer, comprising a light source for emitting a recording light; a light source for emitting a reproducing light; an objective lens for focusing the recording light and the reproducing light emitted from the light sources on the information recording medium; a light detector for detecting a light reflected by the information recording medium; and a second reflected-light reducing portion for reducing a reflected light of the reproducing light transmitting through the information recording medium provided on a surface facing the information recording medium at the other side of the objective lens.

The object, features, aspects and advantages of the invention will become more apparent from a reading of the detailed description below in connection with the accompanying drawings.

DETAILED DESCRIPTION OF THE INVENTION

Hereinafter, preferred embodiments of the invention are described with reference to the accompanying drawings.

First Embodiment

Figure 1:
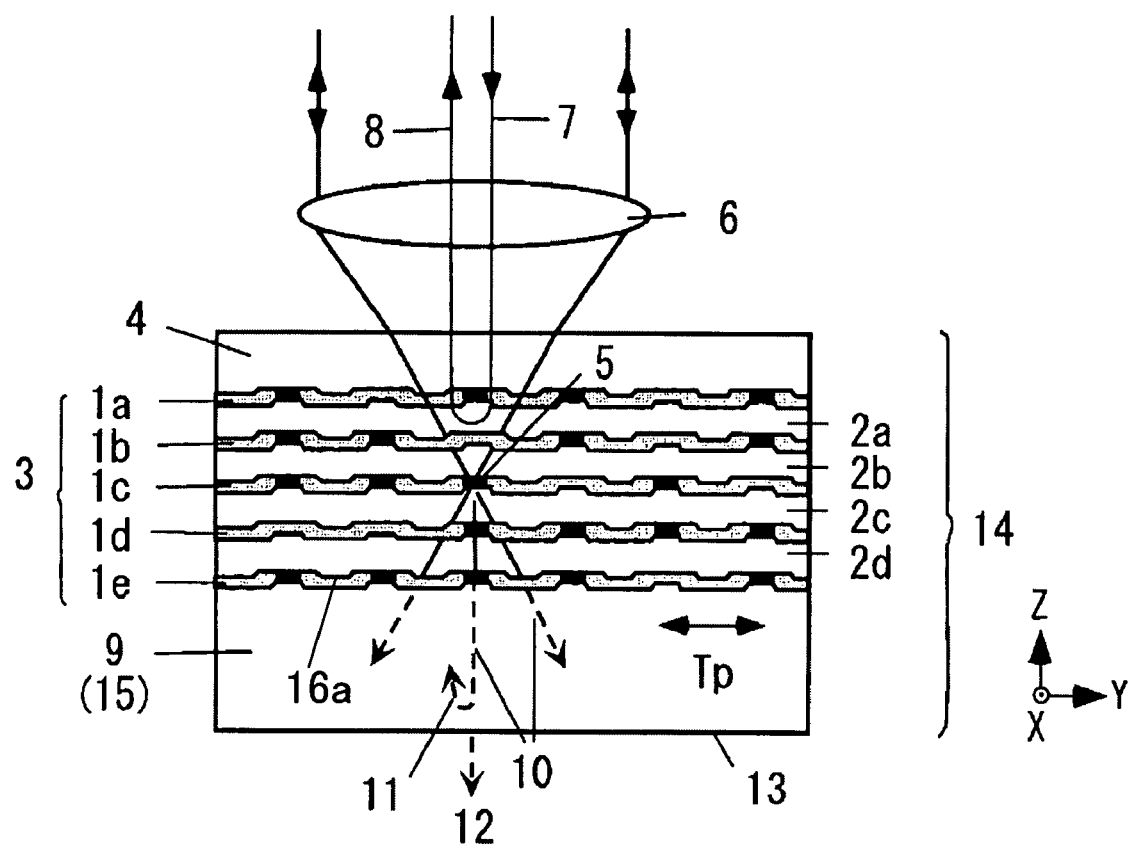
FIG. 1 is a diagram showing a construction of an information recording medium and a state in which a signal is recorded and reproduced according to a first embodiment of the invention.

First, an information recording medium according to a first embodiment of the invention is described in detail with coordinate axes set as shown with reference to FIG. 1. FIG. 1 is a diagram showing a construction of the information recording medium and a state in which a signal is recorded and reproduced according to the first embodiment of the invention. In FIG. 1, a light absorbing portion having an optical characteristic of absorbing a reproducing light is used as a first reflected-light reducing portion.

As shown in FIG. 1, an information recording medium 14 of this embodiment includes a substrate 9 having a thickness of, e.g. 1.1 mm and a recording portion 3 formed at a light incident side of the substrate 9 and having a plurality of recording layers 1 (five layers 1a to 1e in FIG. 1). A light absorbing portion (first reflected-light reducing portion) 15 for reducing a reflected light of a reproducing light from a substrate side is arranged at a side opposite to a light incident side of the recording portion 3. In other words, the substrate 9 acts as the light absorbing portion 15 having a function of the first reflected-light reducing portion in the information recording medium 14 of this embodiment.

It is sufficient for the first reflected-light reducing portion to be arranged at a side opposite to an incident side of the reproducing light with respect to the recording portion in order to reduce at least one kind of the reflected light of the reproducing light reflected from the substrate side, and it is not always necessary to arrange the recording portion and the first reflected-light reducing portion adjacent to each other. Further, since an optical information recording/reproducing apparatus for recording to and reproducing information from the medium is, in some cases, provided with a reflected-light reducing portion for reducing the reflected light of transmitted light having transmitted through the medium in the invention as described later, the reflected-light reducing portion provided in the information recording medium is referred to as the first reflected-light reducing portion and the one provided in the optical information recording/reproducing apparatus is referred to as a second reflected-light reducing portion for the sake of convenience.

In FIG. 1, the recording portion 3 has recording layers 1 and intermediate layers 2 (four layers 2a to 2d in FIG. 1), and is constructed such that the recording layers 1 and intermediate layers 2 are alternately laminated. A protection layer 4 having a thickness of, e.g., 0.1 mm may be additionally provided at the light incident side of the recording portion 3. By providing the protection layer 4, signals can be reproduced even if dust, foreign particles, scratches are, more or less, present on the information recording medium 14.

The recording layers 1 and the intermediate layers 2 are substantially transparent to a recording light and a reproducing light. Here, to be substantially transparent means that light absorptivity per layer is 0.5% or lower, desirably 0 to 0.1% for light having a specified wavelength. Thus, the recording light and the reproducing light can be irradiated up to the deepest layer (1e in FIG. 1) of the information recording medium 14 having a plurality of recording layers 1 without being substantially attenuated. A recording pit 5 is written by changing an optical constant of the desired recording layer 1 of the recording portion 3 by irradiation of the recording light, whereby three-dimensional recording becomes possible.

The recording layers 1 are made of a recording material which is substantially transparent to the recording light, but has absorbency with respect to a half wavelength of the recording light since the recording is carried out by the nonlinear absorption phenomenon such as the two-photon absorption or the multiphoton absorption. For example, recording light which is a pulsed laser beam having a wavelength of 0.78 μm, a pulse width of 100 femtoseconds to 10 nanoseconds and a relatively large peak power of several 100 mW to several W is focused on the desired recording layer 1c by the objective lens 6. By focusing this recording light, absorption occurs as if the wavelength of an irradiated light became a half (0.39 μm) only at a portion (focal point) with a high power density of the light, for example, by the two-photon absorption process which is one of the nonlinear absorption phenomena, whereby the recording pit 5 is written. Although the recording pit 5 is recorded by changing the refractive index of the recording layer 1 in this embodiment out of the optical constants thereof, the optical constant to be changed may be another characteristic. However, the utilization of a change in the refractive index of the recording layer 1 is more preferable for the information recording medium including the recording portion 3 having a multilayer structure because the light loss is less as compared to a case where a change in the absorption is utilized.

A signal written in the recording pit 5 is reproduced by a reproducing light 7. For example, continuous light having a wavelength of 0.65 μm is focused as the reproducing light 7 on the recording pit 5 by the objective lens 6. Reflected light 8 for reproduction reflected by the recording pit 5 is detected by a light detector (not shown) via the objective lens 6, whereby the signal is reproduced. The recording light and the reproducing light may be emitted from the same light source, but the use of different light sources to make the wavelength of the reproducing light shorter than that of the recording light is preferable to obtain higher information density in the case of the recording by the two-photon absorption process.

In this embodiment, each recording layer 1 has tracking guide grooves 16a. Track pitches Tp of the tracking guide grooves 16a are, for example, 0.59 μm, and the depth thereof is, for example, 0.05 μm. Interference lights of zero-order diffraction light and (+/−)first-order diffraction lights from the tracking guide grooves 16a are detected by the light detector (not shown), whereby a tracking error signal is obtained, for example, by the known push-pull method and recording or reproduction is carried out precisely on the tracks.

As described above, the substrate 9 acts as the light absorbing portion 15 in this embodiment. Specifically, the substrate 9 contains a light absorbing material having the optical characteristic of absorbing at least the reproducing light or contains a mixture of the light absorbing material having the optical characteristic of absorbing at least the reproducing light and a resin. For example, a resin composition is prepared by mixing carbon black, which is a fine powder of a carbon material, as a light absorbing material to a polycarbonate resin as a resin component such that the carbon black constitutes 0.1 to 10 mass % of the entire composition, and a substrate produced by injection-molding this composition is used.

Besides the carbon black, carbon materials such as carbon nanotube, fullerene, C60 and C70 can also be cited as the light absorbing materials. Among these carbon materials, the carbon black absorbs most lights within a wavelength region of 0.3 to 0.8 μm even when not only the reproducing light wavelength of 0.65 μm and the recording light wavelength of 0.78 μm, but also a reproducing light wavelength and a recording light wavelength within the wavelength region of 0.3 to 0.8 μm are used. Therefore, the use of the carbon black is preferable since the light absorbing portion having an optical characteristic of absorbing both of the reproducing light wavelength and the recording light wavelength can be formed.

Besides polycarbonates, a PMMA, a norbornen resin (e.g. "Arton" (produced by JSR Co., Ltd.)) or cycloolefin resin (e.g. "Zeonex" (produced by Nippon Zeon Co., Ltd.)) or the like is used as the resin to be contained in the substrate 9.

Besides the carbon materials, semiconductor particles are preferably used as the light absorbing material having the optical characteristic of absorbing the reproducing light. For example, if the reproducing light wavelength is 0.8 μm, semiconductor particles having an energy gap of 1.55 eV or smaller are preferable to absorb light having wavelengths of 0.8 μm or shorter.

Specific examples of semiconductor particles include cadmium selenide (CdSe) having an energy gap of 1.7 eV (absorption wavelength of 0.73 μm or shorter), gallium phosphide (GaP) having an energy gap of 2.25 eV (absorption wavelength of 0.551 μm or shorter), iron oxide ($Fe_2O_3$) having an energy gap of 2.3 eV (absorption wavelength of 0.539 μm), cadmium sulfide (CdS) having an energy gap of 2.5 eV (absorption wavelength of 0.496 μm or shorter), and silicon carbide (SiC) having an energy gap of 3.0 eV (absorption wavelength of 0.413 μm), and semiconductor particles absorbing a light of a specified wavelength are selected in conformity with the wavelength of the reproducing light. A mixing mass ratio of the semiconductor particles to the resin when the semiconductor particles are used while being mixed with the resin is about 0.1 to 1 mass %, at most about 10 mass % in order to obtain a sufficient absorbing effect.

In the invention, organic coloring agents are also effective as another light absorbing materials having the optical characteristic of absorbing the reproducing light. Specifically, cyanine coloring agents, azo coloring agents, phthalocyanine coloring agents, pyrromethene coloring agents, metal complex coloring agents and the like used in CD-Rs and DVD-Rs are, for example, preferable due to their easy handling and environment resistance. For example, since the phthalocyanine coloring agents have an absorption maximum wavelength between about 0.65 μm and about 1.4 μm, an absorbing effect can be obtained if the wavelength of the reproducing light is 0.65 μm or longer.

Further, in the invention, dyes or pigments may be used as another light absorbing materials. Specifically, there can be cited, for example, dyes such as azo dyes, anthraquinone dyes, indigoid dyes, sulfide dyes, triphenylmethane dyes, pyrazolone dyes, stilbene dyes, diphenylmethane dyes, xanthene dyes, alizarin dyes, acridine dyes, quinonimine dyes (azine dyes, oxazine dyes, thiazine dyes), thiazole dyes, methine dyes, nitro dyes, nitroso dyes, and cyanine dyes, and organic pigments such as phthalocyanine pigments, dioxazine pigments and anthraquinone pigments. Inorganic pigments such as black pigments, white pigments and color pigments are also useful.

In the invention, a thickness of the recording layer is of, e.g. 0.1 to 1 µm. The recording layer is made of a recording material obtained by mixing a substantially transparent resin with diarylethene, which is one of photochromic materials, or its derivatives in such a manner as to constitute 10 to 50 mass % of the resin with respect to the entirety. By using a photochromic material, write-once recording or rewritable recording according to which recording can be carried out in a photon mode can be realized. Among photochromic materials, diarylethene or its derivatives are preferable because thermally stable recording can be obtained.

There are various derivatives of diarylethene. Specifically, these derivatives include, for example, 1,2-bis[2-methylbenzo[b]thiophen-3-yl]-3,3,4,4,5,5-hexafluoro-1-cyclopentene, 2,3-bis(2,4,5-trimethyl-3-thienyl)maleic anhydride, 2,3-bis(2,4,5-trimethyl-3-thienyl)maleimide, and cis-1,2-dicyano-1,2-bis(2,4,5-trimethyl-3-thienyl)ethene. However, the invention is not limited to these materials, and any material is preferably usable as the recording material provided that it has a backbone structure of diarylethene.

Further, by mixing diarylethene or its derivative, for example, with a substantially transparent resin such as a PMMA or an ultraviolet-curing resin, an effect of preventing the recrystallization of diarylethene can be obtained.

The recording layer of the invention preferably contains a fluorescent material that emits, at a high efficiency, a light of a wavelength, for example, for exposing the photochromic material in the two-photon absorption process of the recording light. In the case where the recording layer contains such a fluorescent material, the sensitivity of the recording material can be improved. In other words, the photochromic materials generally have low recording sensitivities in the two-photon absorption process, whereas some fluorescent materials have high recording sensitivities in the two-photon absorption process. Accordingly, the photochromic material generally having good one-photon absorption sensitivity is exposed to light in the one-photon absorption process by the two-photon fluorescence of the fluorescent material.

Specifically, such fluorescent materials include, for example, inorganic fluorescent materials such as europium-activated strontium.magnesium pyrophosphate [$(Sr,Mg)_2 P_2O_7$:Eu] and organic fluorescent coloring agent such as para-terphenyl.

As other recording materials preferably used for the recording layer of the invention, the materials such as side chain liquid crystal polymers, photopolymers, in which recording can be carried out in the photon mode, are exemplified. The recording layer containing a side chain liquid crystal polymer has a characteristic of increasing a change (e.g. $\Delta n=0.2$) in the refractive index of the recording pit after the recording, and a polarizing direction is also recorded therein, wherefore the recording capacity can be substantially doubled as compared to normal recording. Photopolymers are preferable because the materials are suitable for write-once recording and stable after the recording.

The photopolymer can be obtained, for example, from two kinds of photopolymerizing monomers, a polymerization initiator and a sensitizing coloring agent. More specifically, methacrylic compounds and acrylic compounds are cited as photopolymerizing monomers; benzyl as a polymerization initiator; and Michler's ketone as a sensitizing coloring agent. The recording layer containing such a photopolymer has the refractive index thereof increased through the condensation and polymerization of the methacrylic compound having a high photopolymerization speed by the two-photon absorption at a focal point of a converged spot during the recording. At this time, the acrylic monomer is pushed away from a recording pit section by the diffusion, thereby forming a refractive index pit.

Materials preferably used for the recording layers other than the above include organic coloring agents, resin films containing ultrafine particles such as ZnO, and $TeO_2$ films. These materials are preferable because the absorption loss of the light is reduced by utilizing changes in the refractive indices of these materials. In the invention, an amount of a refractive index change may be controlled by an irradiating method of the recording light. Further, an empty pit called void may be recorded, using a pulsed beam having a relatively high peak power of several W to several 10 kW as the recording light. Since the refractive index is 1 if the pit is void, the amount of the refractive index change $\Delta n$ is as large as $-0.7$ if the refractive index of the recording layer is, for example, 1.7. Thus, signals can be reproduced with good contrast. Further, phase change materials are not suitable for the recording in a larger number of layers since the recording is carried out utilizing the absorption of the light, but can be used as a recording material for the recording layers for a multilayer optical disk having about two to six layers.

The same resin as the recording layers 1 or a different resin is used for the intermediate layers 2 formed between the recording layers 1 in order to obtain a specified refractive index or lower at the interfaces with the recording layers 1. Such resins include ultraviolet-curing resins and thermosetting resins. Specifically, these resins include, for example, acrylic resins such as urethane acrylates, epoxy acrylates and polyacrylates, unsaturated polyester resins, epoxy resins, cationic polymer resins, phenol resins, urea resins, melanin resins.

A conventionally known producing method can be adopted as a method for producing the information recording medium 14. Specifically, the recording layer 1e is first formed by a coating method such as a spin-coating method on the substrate 9 formed with tracking grooves, for example, by injection molding. The intermediate layer 2d is similarly formed on the recording layer 1e. Thereafter, the tracking grooves 16a are formed, for example, by a transfer method. Similarly, the recording layer 1d, the intermediate layer 2c, . . . are repeatedly formed, thereby producing the recording portion 3. Finally, the protection layer 4 is formed on the recording portion 3, for example, by a coating method or a film forming method.

In the case of reproducing information from the information recording medium of the invention, the reproducing light 7 is focused on and irradiated to the desired recording pit 5 in a plurality of recording layers 1 by the objective lens 6 in FIG. 1. Part of this reproducing light 7 is reflected to become the reflected light 8 for reproduction having a signal, is converted into a substantially parallel light by the objective lens 6, and is detected by the light detector (not shown), whereby the information in the information recording medium is reproduced.

The information recording medium of the invention has no metal reflection film between the recording portion 3 and the substrate 9 for three-dimensional recording. Thus, out of the recording light 7, the transmitted light 10 having passed through the recording pit 5 turns into an unnecessary light and enters the substrate 9. This incident light is reflected from the substrate side and returns as the reflected light 11, thereby creating a stray light.

However, since the substrate 9 of this embodiment acts as the light absorbing portion 15 and the light absorbing portion 15 has the optical characteristic of absorbing at least the reproducing light, the transmitted light 10 is attenuated by being gradually absorbed in the substrate 9. Thus, an amount of the transmitted light 10 reaching the underside 13 of the substrate in the substrate 9 lessens, thereby reducing the reflected light 11 reflected by the underside 13 of the substrate.

In the case where the mixed amount of the light absorbing material in the substrate 9 is small and, hence, the light absorbing effect is small, an amount of a transmitted light 12 transmitting through the underside 13 of the substrate 9 increases, and part of the transmitted light 10 is reflected in Z-axis direction by the underside 13, thereby turning into the reflected light 11, which returns toward the recording portion 3. However, since the substrate 9 acts as the light absorbing portion 15, the stray light can be reduced if the light absorptivity of the light absorbing portion 15 is set such that the reflected light 11 is attenuated while returning in the substrate 9 and hardly any light returns to the recording portion 3.

Accordingly, in the information recording medium 14 of the first embodiment, a noise light is reduced by an effect of cutting the reflected light 11 of the reproducing light, which turns into the stray light returning upon being reflected by the underside 13 of the substrate 9. Thus, an excellent SN ratio of the reproducing signal can be obtained even in an information recording medium having recording layers in which three-dimensional recording is carried out.

In the case where the light absorbing portion is used as the first reflected-light reducing portion in the invention, a sufficient effect can be obtained if the light absorptivity of the reproducing light is 5% or higher, and a more preferable effect can be obtained if it is 50% or higher.

In this embodiment, the light absorbing portion 15 preferably has an optical characteristic of absorbing the recording light. In the case where the light absorbing portion 15 has the optical characteristic of absorbing the recording light as much as the reproducing light, the reflected light from the substrate 9 side can be prevented from being included in tracking error signals from the tracking guide grooves 16a of the respective recording layers 1 even at the time of the recording, whereby the tracking error signals having satisfactory SN ratios can be obtained.

As the light absorbing material used for such a light absorbing portion, carbon black having an optical characteristic of absorbing a light in a wavelength region of 0.3 to 0.8 μm is preferably used, for example, if the wavelength of the recording light is 0.78 μm.

In this embodiment, another light absorbing portion may be formed at the light incident side of the substrate 9 as the light absorbing portion 15 or at the underside 13 opposite to the former side. A reflectance reducing portion having an optical characteristic of reducing the reflectance of a dielectric film or a diffractive optical element having a sub-wavelength structure, which is each another first reflected-light reducing portion to be described later, may be formed on the underside 13 of the substrate. In other words, two or more first reflected-light reducing portions of the invention may be formed in the medium. If these first reflected-light reducing portions are formed at the light incident side of the substrate 9 and at the underside 13, the reflection by the interface between the recording portion 3 and the substrate 9 and by the underside 13 can also be reduced when the reproducing light 7 is incident on the substrate 9 after passing the recording pit 5. It is particularly effective when differences between the refractive indices of the recording layers 1 and the intermediate layers 2 and that of the substrate 9 are large.

Second Embodiment

Figure 2:
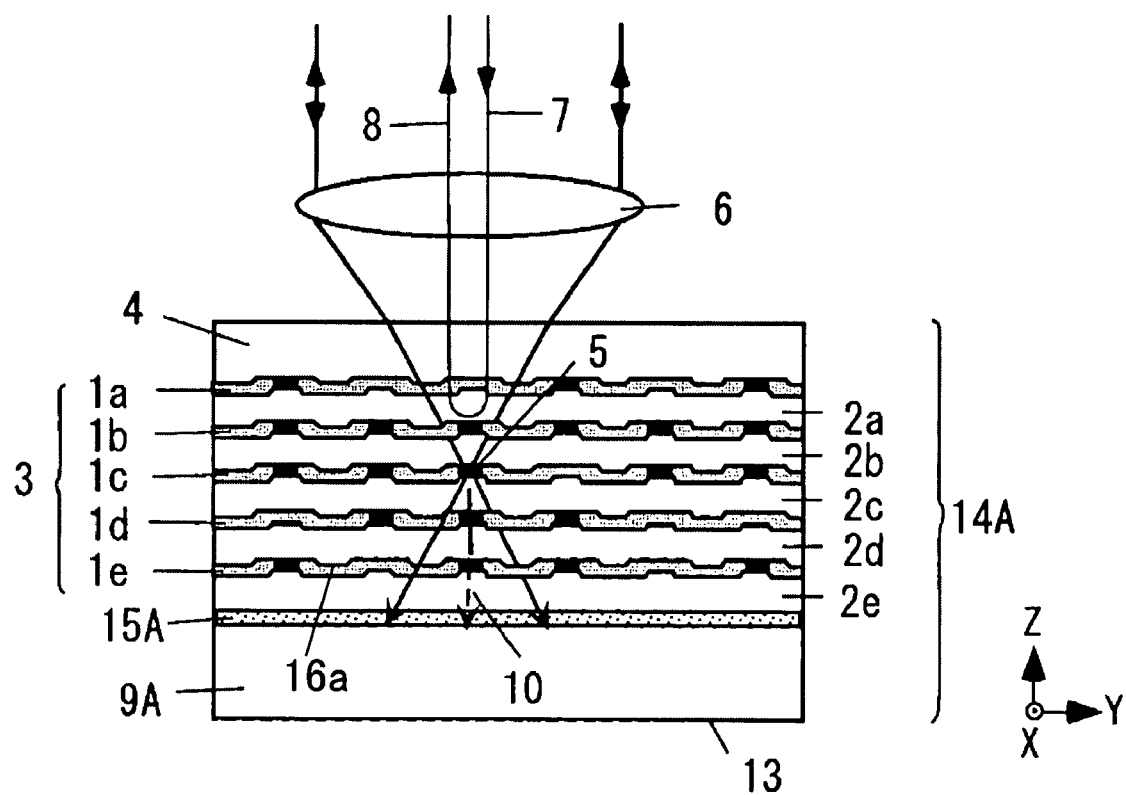
FIG. 2 is a diagram showing a construction of an information recording medium and a state in which a signal is recorded and reproduced according to a second embodiment of the invention.

Next, an information recording medium according to a second embodiment of the invention is described with reference to FIG. 2, focused on points of difference from the first embodiment. FIG. 2 is a diagram showing a construction of the information recording medium and a state in which a signal is recorded and reproduced according to the second embodiment of the invention. In FIG. 2, a light absorbing portion having an optical characteristic of absorbing reproducing light is used as a first reflected-light reducing portion similar to the first embodiment.

As shown in FIG. 2, an information recording medium 14A of this embodiment includes a substrate 9A and a recording portion 3 formed at a light incident side of the substrate 9A and having a plurality of recording layers 1 (five layers 1a to 1e in FIG. 2) and intermediate layers 2 (five layers 2a to 2e in FIG. 2). A light absorbing portion 15A having an optical characteristic of absorbing at least reproducing light is arranged between the substrate 9A and the recording portion 3 at a side opposite to an incident side of a reproducing light 7 with respect to the recording portion 3. A protection layer 4 is further formed at the light incident side of the recording portion 3.

The second embodiment differs from the information recording medium of the first embodiment in that the light absorbing portion 15A is arranged as a light absorbing layer between the substrate 9A and the recording portion 3. By adopting this construction, a transparent substrate made of, e.g. a polycarbonate is used as the substrate 9A similar to the conventional medium.

A light absorbing layer in the form of a thin film containing a light absorbing material having an optical characteristic of absorbing the reproducing light such as a carbon material or semiconductor particles mentioned in the first embodiment is used as the light absorbing portion 15A. The thickness of this light absorbing layer is, for example, several μm. The light absorbing layer is formed by applying a composition obtained by mixing the above light absorbing material and a binder resin such as a PMMA or an ultraviolet-curing resin by a spin-coating method, a printing method or the like. Accordingly, the light absorbing layer is easy to handle and can be simply produced.

Similar to the information recording medium of the first embodiment, a transmitted light 10 having passed through a recording pit 5 is incident on the light absorbing portion 15A in this embodiment. Since the light absorbing portion 15A is the light absorbing layer having the optical characteristic of absorbing the reproducing light, the transmitted light 10 will either disappear or will enter the substrate 9A after being mostly attenuated. Thus, a reflected light of the reproducing light reflected by an underside 13 of the substrate 9A are reduced, thereby reducing an amount of the reflected light returning to the recording portion 3 again.

The reflection of the reproducing light at a substrate side occurs also by an interface between the substrate 9A and the recording portion 3. Since the light absorbing portion 15A is formed between the recording portion 3 and the substrate 9A in this embodiment, the reflected lights reflected at the light incident side of the substrate are also reduced.

Accordingly, in the information recording medium of the second embodiment, noise lights can be reduced and the SN ratio of a reproduced signal can be improved by an effect of cutting the reflected lights of the reproducing light returning from the substrate 9A side.

In this embodiment, the light absorbing portion 15A preferably has an optical characteristic of absorbing recording light similar to the first embodiment. Such a light absorbing portion 15A can prevent the reflected light from the substrate 9A from being included in tracking error signals from tracking grooves 16a of the respective recording layers 1 also at the time of the recording, whereby the tracking error signals having satisfactory SN ratios can be obtained.

In this embodiment, the light absorbing portion 15A comprised of the light absorbing layer may be formed on the underside 13 at a side opposite to the incident side of the reproducing light 7 with respect to the substrate 9A. By forming the light absorbing layer at the side opposite to the incident side of the reproducing light with respect to the substrate 9A, the light reflected by the underside 13 of the substrate 9A is cut to obtain similar effects.

Third Embodiment

Figure 3:
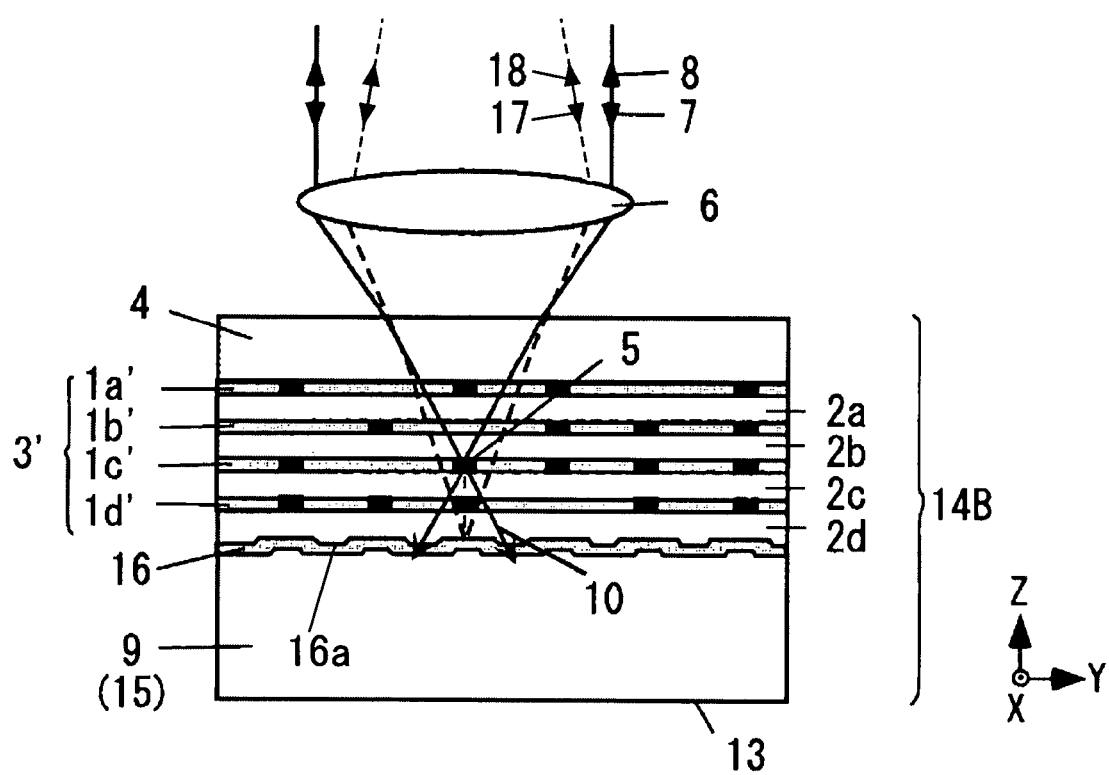
FIG. 3 is a diagram showing a construction of an information recording medium and a state in which a signal is recorded and reproduced according to a third embodiment of the invention.

Next, an information recording medium according to a third embodiment of the invention is described with reference to FIG. 3, focused on points of difference from the first embodiment. FIG. 3 is a diagram showing a construction of the information recording medium and a state in which a signal is recorded and reproduced according to the third embodiment of the invention. In FIG. 3, a light absorbing portion having an optical characteristic of absorbing reproducing light is used as a first reflected-light reducing portion similar to the first embodiment.

As shown in FIG. 3, an information recording medium 14B of this embodiment includes a substrate 9 and a recording portion 3' formed at a light incident side of the substrate 9 and having a plurality of recording layers 1' (four layers 1a' to 1d' in FIG. 3) and intermediate layers 2 (four layers 2a to 2d in FIG. 3). A tracking guide layer 16 is formed between the substrate 9 and the recording portion 3' at a side opposite to a light incident side of the recording portion 3'. Similar to the first embodiment, the substrate 9 acts as a light absorbing portion 15 having an optical characteristic of absorbing a reproducing light. A protection layer 4 is further formed at the light incident side of the recording portion 3'.

The information recording medium 14B of this embodiment differs from the information recording medium of the first embodiment in that each recording layer 1' has no tracking guide grooves and the tracking guide layer 16 is formed between the substrate 9 and the recording portion 3'. In the case where such recording layers 1' having no tracking guide grooves are used, the reflection and diffraction of light at the tracking guide grooves of the recording layer, which are physical convexity and concavity, can be prevented. Thus, stray light created at the tracking guide groove at the time of the recording and the reproduction can be reduced. Further, since the recording layers 1' and the intermediate layers 2 are alternatively laminated by a continuous spin-coating method in this embodiment, the production is easier.

In the information recording medium 14B of this embodiment, a diverging light is so incident on an objective lens 6 as to be focused on the tracking guide layer 16, whereby a tracking-guide irradiating light 17 is irradiated. Then, a tracking-guide reflected light 18, which is an interference light of a zero-order diffracted light and +/−first-order diffracted lights from the tracking guide groove 16a, is detected by a light detector (not shown), whereby a tracking error signal is obtained. The tracking-guide irradiating light 17 may have the same wavelength as reproducing light or recording light or may have a different wavelength.

The same substrate as the one described in the first embodiment is used as the substrate 9 that acts as the light absorbing portion 15. Accordingly, in the information recording medium 14B of the third embodiment as well, a noise light can be reduced and the SN ratio of a reproduced signal can be improved by an effect of cutting the reflected light of the reproducing light returning from the substrate 9 side.

In this embodiment, the substrate 9 preferably has an optical characteristic of also absorbing the tracking-guide irradiating light 17. By using the substrate having such an optical characteristic, the reflected light of the tracking-guide irradiating light returning from the substrate 9 side can be similarly reduced, whereby the SN ratios of the reproduced signal and tracking error signals can be even more improved.

As a light absorbing material used for such a light absorbing portion 15, carbon black having an optical characteristic of absorbing light in a wavelength region of 0.3 to 0.8 μm, is preferably, if the wavelength of a tracking guide light is the same as that of the reproducing light, i.e. 0.66 μm.

A method for producing the information recording medium 14B of this embodiment is as follows. The intermediate layer 2d is first formed on the substrate 9 formed with the tracking guide layer 16, for example, by a spin-coating method or a like coating method. The recording layer 1d' is formed on the intermediate layer 2d by a similar method. Further, the intermediate layer 2c, the recording layer 1c', . . . are repeatedly formed on the recording layer 1d'. Finally, the protection layer 4 is formed at the light incident side of the recording portion 3', for example, by a coating method, a film forming method or the like. Since the respective recording layers 1' and intermediate layers 2 have no tracking guide grooves in this embodiment, the recording layers 1' and the intermediate layers 2 can be successively formed by the coating method, wherefore the recording portion 3' can be easily produced to enable a cost reduction.

In this embodiment, the intermediate layers 2 and the recording layers 1' may be excessively formed. Some of the excessively formed intermediate layers 2 and recording layers 1' (i.e. part of the recording portion at the light incident side) may be used as the protection layer 4. By doing so, it becomes unnecessary to form the protection layer 4 in a separate operation step, and the protection layer substantially made of the same material as the recording portion 3 can be formed.

In this embodiment, the tracking guide layer 16 may be formed as another first reflected-light reducing portion. For example, in the case where the tracking guide layer 16 containing a light absorbing material is formed, the transmission of the transmitted light 10 into the substrate 9 can be suppressed to reduce the reflected light of the reproducing light from the substrate 9 side.

Fourth Embodiment

Figure 4:
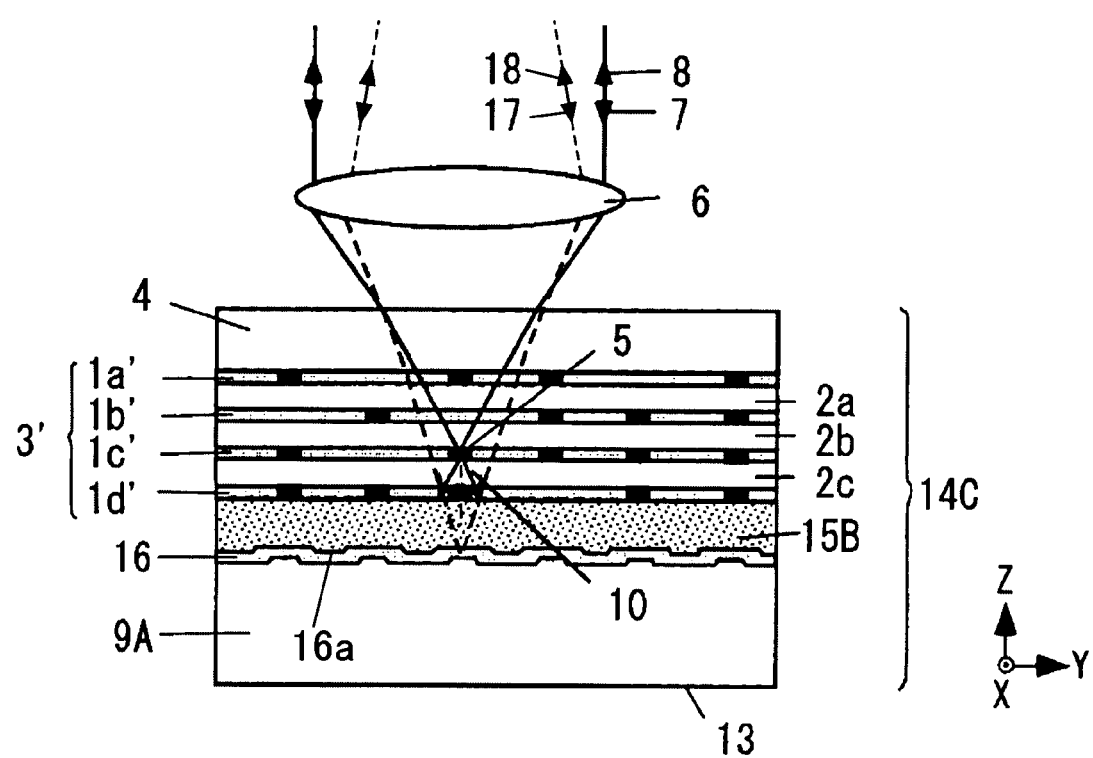
FIG. 4 is a diagram showing a construction of an information recording medium and a state in which a signal is recorded and reproduced according to a fourth embodiment of the invention.

Next, an information recording medium according to a fourth embodiment of the invention is described with reference to FIG. 4, focused on points of difference from the third embodiment. FIG. 4 is a diagram showing a construction of the information recording medium and a state in which a signal is recorded and reproduced according to the fourth embodiment of the invention. In FIG. 4, a light absorbing portion having an optical characteristic of absorbing a reproducing light is used as a first reflected-light reducing portion.

As shown in FIG. 4, an information recording medium 14C of this embodiment includes a substrate 9A and a recording portion 3' formed at a light incident side of the substrate 9A and having a plurality of recording layers 1' (four layers 1a' to 1d' in FIG. 4) and intermediate layers 2 (three layers 2a to 2c in FIG. 4). A tracking guide layer 16 and a light absorbing portion 15B are arranged in this order from the side of the substrate 9A are arranged between the substrate 9A and the recording portion 3' at a side opposite to a light incident side of the recording portion 3'. This light absorbing portion 15B has an optical characteristic of absorbing a reproducing light. Further, each recording layer 1' has no tracking guide grooves, and a protection layer 4 is further formed at the light incident side of the recording portion 3'.

The information recording medium 14C of this embodiment differs from the information recording medium of the third embodiment in that the light absorbing portion 15B is arranged as a light absorbing layer between the tracking guide layer 16 and the recording portion 3', and this light absorbing layer has an optical characteristic of permitting the transmission of a tracking-guide irradiating light 17 and a tracking-guide reflected light 18 having a wavelength different from that of a reproducing light 7 wavelength.

In the case where the light absorbing portion 15B comprised of such a light absorbing layer is formed between the recording portion 3' and the substrate 9A, a transmitted light 10 of the reproducing light 7 having transmitted through a recording pit 5 is attenuated before being incident on the substrate 9A, wherefore reflected lights of the reproducing light from the substrate 9A side are reduced. Although part of the transmitting light 10 having transmitted through the light absorbing portion 15B returns to the recording portion 3' as a reflected light reflected by an underside 13 of the substrate 9A, it is absorbed by the light absorbing portion 15B before being incident on the recording portion 3' again. Thus, the reflected light is reduced. Further, since each recording layer 1' has no tracking guide grooves and the tracking guide layer 16 is formed separately from the recording layers 1' in this embodiment, reflected and diffracted lights created by the physical convexity and concavity of the recording layers 1' can also be prevented. Furthermore, since the light absorbing portion 15B has a function of permitting the transmission of the tracking-guide irradiating light 17 and the tracking-guide reflected light 18, there is no likelihood of hindering the detection of tracking guide grooves 16a.

The light absorbing portion 15B of this embodiment is made of a material obtained by mixing, for example, semiconductor particles such as cadmium selenide (absorption wavelength of 0.73 μm or shorter) as a light absorbing material with a resin such as a PMMA, for example, in the case where a light having a wavelength of 0.66 μm is used as the reproducing light and a light having a wavelength of 0.78 μm is used as a tracking guide light.

Since the light absorbing portion 15B is used as the first reflected-light reducing portion in this embodiment, a transparent substrate made of, e.g. polycarbonate is used as the substrate 9A similar to the conventional medium. Further, since the light absorbing portion 15B acts as the intermediate layer 2d of the information recording medium 14B of the third embodiment, not only the construction is simpler, but also the transmitted light 10 of the reproducing light having passed through the recording pit 5 hardly reaches the tracking guide layer 16 by being absorbed with the light absorbing portion 15B. Therefore, the influence of the reflected and diffracted lights from the tracking guide layer 16 can be reduced, and the SN ratio of a reproduced signal can further be improved.

In this embodiment, the light absorbing portion 15B may be provided as a light absorbing layer between the tracking guide layer 16 and the substrate 9A. Even by such a light absorbing portion, the reflected light of the reproducing light from the substrate can be similarly reduced. It is understood that the light absorbing portion may not have an optical characteristic of permitting the transmission of the tracking guide light in this case since the light absorbing portion is located closer to the substrate 9A located below than the tracking guide layer.

Fifth Embodiment

Figure 5:
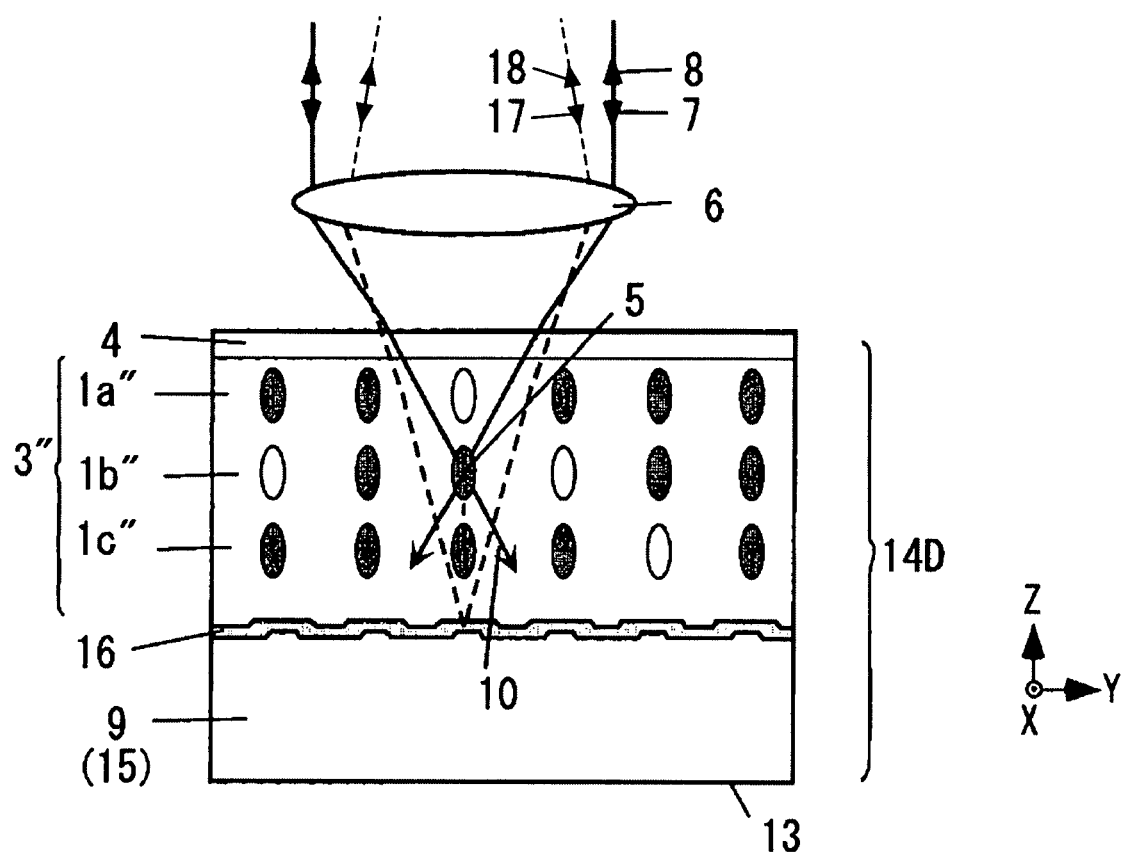
FIG. 5 is a diagram showing a construction of an information recording medium and a state in which a signal is recorded and reproduced according to a fifth embodiment of the invention.

Next, an information recording medium according to a fifth embodiment of the invention is described with reference to FIG. 5, focused on points of difference from the third embodiment. FIG. 5 is a diagram showing a construction of the information recording medium and a state in which a signal is recorded and reproduced according to the fifth embodiment of the invention. In FIG. 5, a light absorbing portion having an optical characteristic of absorbing an reproducing light is used as a first reflected-light reducing portion.

As shown in FIG. 5, an information recording medium 14D of this embodiment differs from the information recording medium of the third embodiment in that there are no intermediate layers. Specifically, the entirety of a recording portion 3'' formed on a substrate 9 provided with a tracking guide layer 16 constitutes a recording layer. Similar to the first embodiment, the substrate 9 acts as a light absorbing portion 15 having an optical characteristic of absorbing the reproducing light. A protection layer 4 is further formed at a light incident side of the recording portion 3''.

Although the recording layer of the recording portion 3'' has no layered structure, virtual recording layers 1'' (1a'' to 1c'' in FIG. 5) are defined, whereby three-dimensional recording and reproduction can be carried out in Z-axis direction.

By providing the substrate 9 acting as the light absorbing portion 15 at a side opposite to an incident side of the reproducing light with respect to the recording portion 3'', the entire of which constitutes the recording layer 1'', a reflected light of the reproducing light from the substrate side can be reduced similar to the third embodiment. Further, since the tracking guide layer 16 is formed separately from the recording layer, the influence of reflection and diffraction at tracking guide grooves of the recording layer can also be prevented. Furthermore, since the recording portion 3'' does not have recording layers defined by the layered structure, it has a single refractive index and reflection occurring between the recording layers and the intermediate layers can also be prevented. Since the recording portion 3'' is comprised of one recording layer 1'', the information recording medium 14D can be easily produced and a price reduction can be accomplished.

At least one of recording materials selected from the aforementioned photopolymers, diarylethene and its derivatives is used as a recording material for such a recording portion. The recording portion is produced by applying a solution containing the recording material onto the substrate by a casting method or the like. A specific method would be, for example, a method for casting a solution obtained by mixing diarylethene and a PMMA to a specified thickness.

In this embodiment as well, another light absorbing portion may be provided as described in the first embodiment. Further, a reflectance reducing portion having an optical characteristic of reducing the reflectance of the reproducing light may be further formed as another first reflected-light reducing portion at a side opposite to the light incident side of the tracking guide layer 16. For example, the reflectance reducing portion may be provided between the tracking guide layer 16 and the substrate 9 or on an underside 13 of the substrate 9.

Sixth Embodiment

Figure 6:
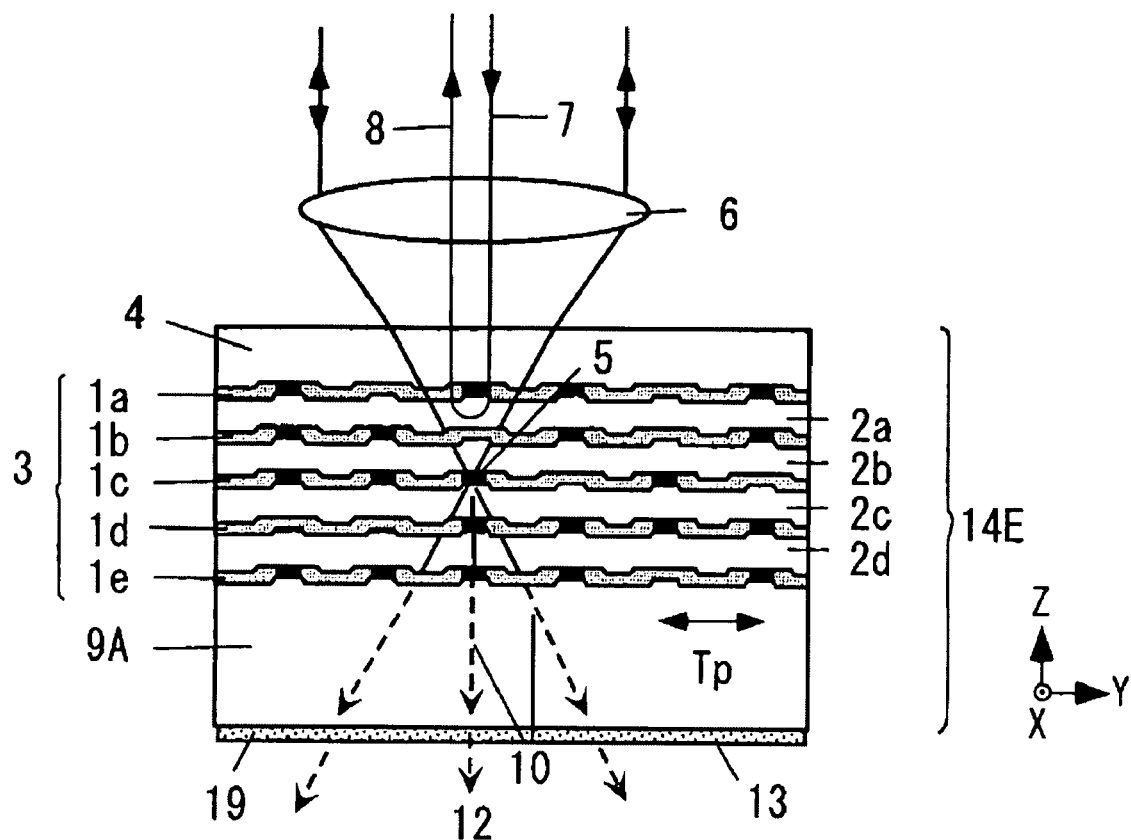
FIG. 6 is a diagram showing a construction of an information recording medium and a state in which a signal is recorded and reproduced according to a sixth embodiment of the invention.

Next, an information recording medium according to a sixth embodiment of the invention is described with reference to FIG. 6, focused on points of difference from the second embodiment. FIG. 6 is a diagram showing a construction of the information recording medium and a state in which a signal is recorded and reproduced according to the sixth embodiment of the invention. In FIG. 6, a reflectance reducing portion having an optical characteristic of reducing the reflectance of a reproducing light is used as a first reflected-light reducing portion unlike the second embodiment.

As shown in FIG. 6, an information recording medium 14E of this embodiment includes a substrate 9A and a recording portion 3 formed at a light incidence side of the substrate 9A and having recording layers 1. Three-dimensional recording can be carried out in the recording portion 3 by changing an optical constant of the recording layers 1 by an irradiation of a recording light. A reflectance reducing portion 19 (first reflected-light reducing portion) having an optical characteristic of reducing the reflectance of at least a reproducing light 7 is formed at a side opposite to the light incident side of the substrate 9A.

The information recording medium 14E of this embodiment differs from the information recording medium 14 of the second embodiment in that the reflectance reducing portion 19 is formed on an underside 13 of the substrate 9A at the side opposite to the light incident side.

The reflectance reducing portion 19 may specifically be an antireflection film that is a dielectric film of $SiO_2$, $MgF_2$, $TiO_2$ or the like and has a thickness of about 0.1 to 2 µm. The dielectric film may have a single layer structure or a multilayer structure. Instead of making the reflectance reducing portion 19 of a dielectric material as described above, a diffractive optical element having a height of about 0.2 to 2 µm and a so-called sub-wavelength structure having a period shorter than the wavelength of the reproducing light and a conical or cylindrical shape may be used as such. The diffractive optical element having the sub-wavelength structure is preferable in terms of cost reduction since it can be so formed as to be integral to the underside 13 of the substrate 9, for example, by injection molding.

In the case where the reflectance reducing portion 19 is used as the first reflected-light reducing portion in the invention, a sufficient effect can be obtained if a reduction rate of the reflectance of the reproducing light is 5% or more, and the reduction rate is more preferably 50% or more.

Although the transmitted light 10 having passed through a recording pit 5 reaches the underside 13 of the substrate 9A in this embodiment, it is emitted into the air from the substrate 9A as a transmitted light 12, without being substantially absorbed or reflected by providing the reflectance reducing portion 19 having a sub-wavelength structured surface. Thus, an amount of reflected light of the reproducing light returning from the substrate 9A side to the recording portion 3 lessens. Particularly, since the reproducing light is largely reflected by the underside 13 of the substrate 9A, the arrangement of such a reflectance reducing portion 19 is effective.

Accordingly, in the information recording medium of the sixth embodiment, a noise light can be reduced and the SN ratio of a reproduced signal can be improved by an effect of reducing the reflected light, which turns into a stray light returning from the substrate 9A side.

As described above, similar effects can be obtained by providing the above reflectance reducing portion 19 on the undersides of the substrates of the information recording mediums of the other embodiments. For example, the reflectance reducing portion may be used together with a light absorbing portion if the reflectance of the reproducing light is reduced only by a small amount. Specifically, a substrate obtained by containing a light absorbing material as the light absorbing portion may, for example, be used for the substrate 9A formed with the reflectance reducing portion 19. Alternatively, a light absorbing layer may be provided between the recording portion 3 and the substrate 9A. In the case where such a light absorbing portion is jointly used, the reflected light from the substrate side can be further reduced.

Further, a recording layer having no tracking guide grooves may be used and a tracking guide layer may be separately formed in this embodiment as well. Alternatively, a construction in which the entire recording portion constitutes a recording layer may be adopted.

Seventh Embodiment

Figure 7:
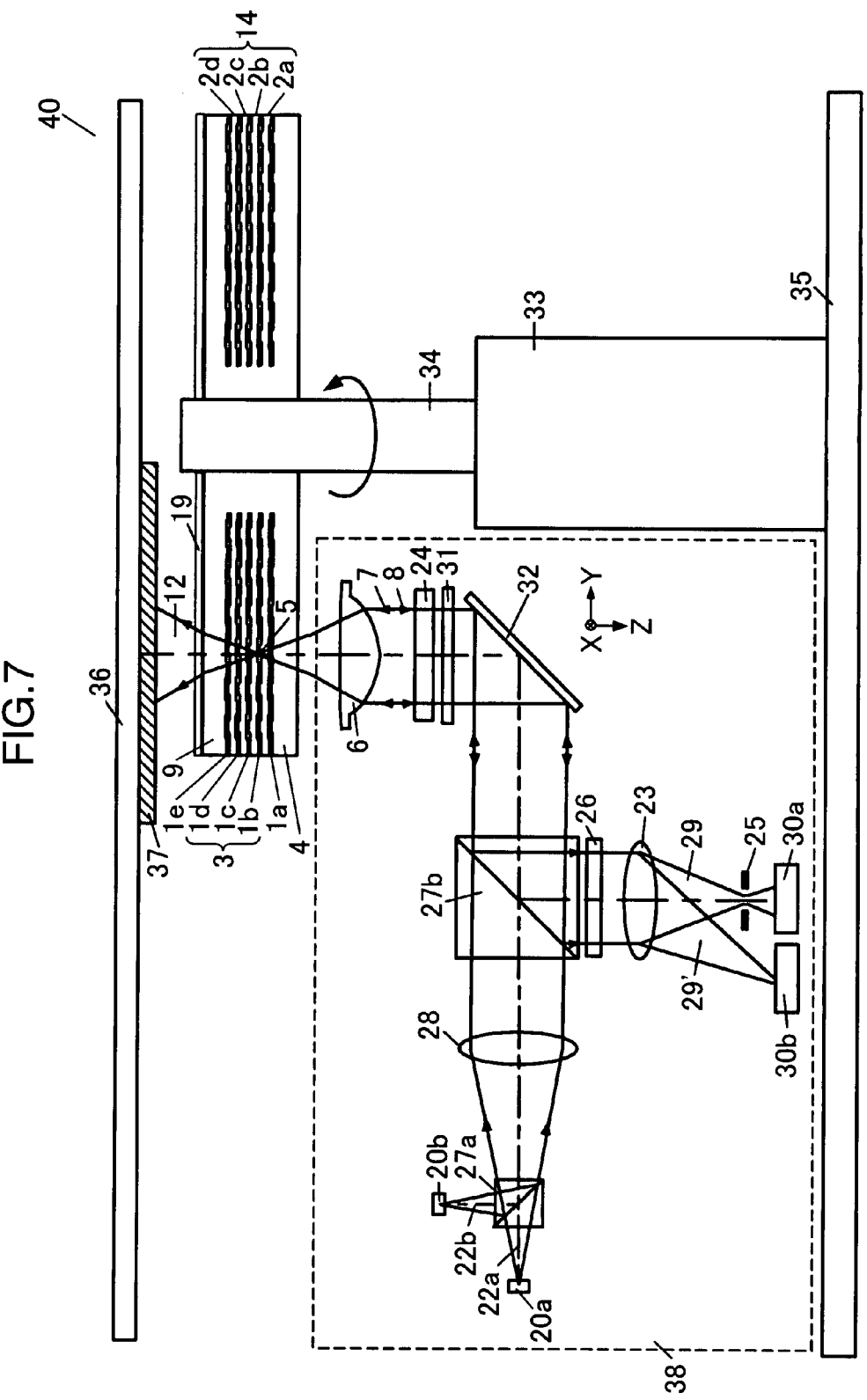
FIG. 7 is a diagram showing a construction of an information recording medium and a state in which a signal is recorded and reproduced according to a seventh embodiment of the invention.
Figure 8:
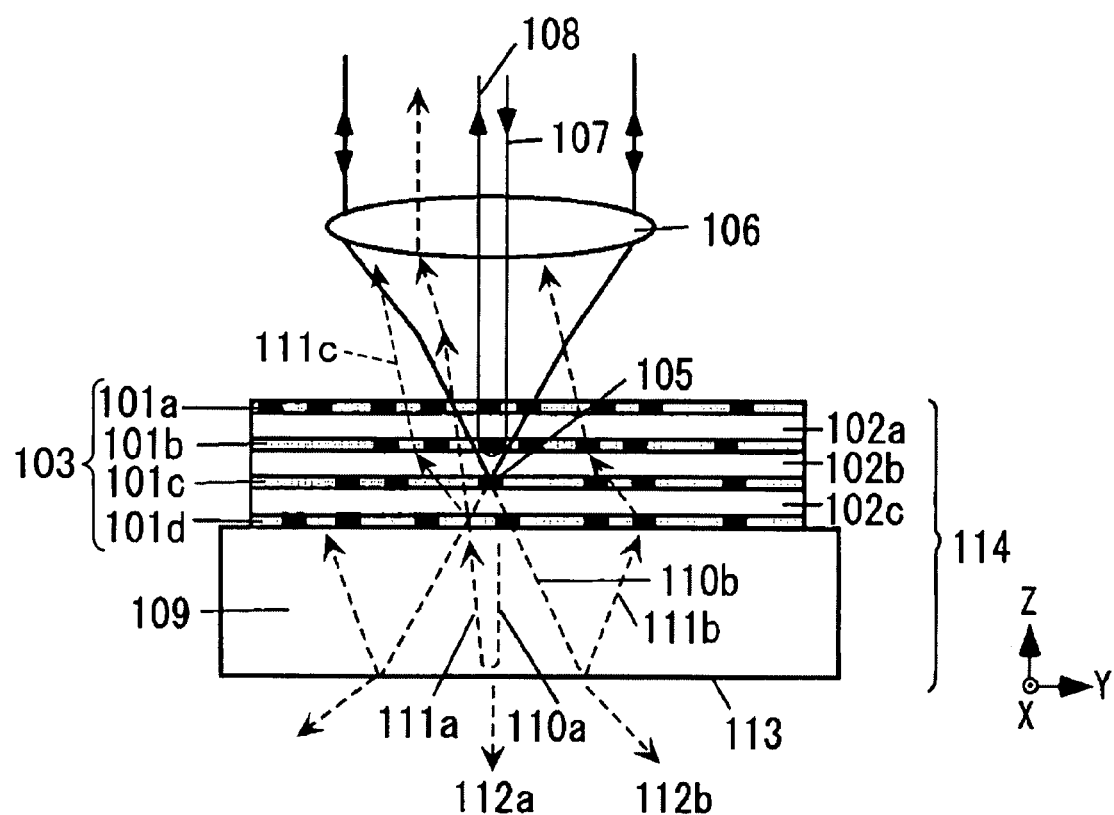
FIG. 8 is a diagram showing a construction of a conventional information recording medium and a state in which a signal is recorded and reproduced.

Next, an optical information recording/reproducing apparatus of the invention is described. As shown in FIG. 7, an optical information recording/reproducing apparatus 40 of this embodiment has an optical pickup unit 38 enclosed by dotted line. Two kinds of light sources, i.e. a light source for recording 20a and a light source for reproduction 20b having different wavelengths are provided in this optical pickup unit 38. Beam splitters 27a, 27b, a collimator lens 28, a deflecting mirror 32, a wavelength plate 31, a spherical-aberration correcting element 24 and an objective lens 6 are arranged on light paths from the light sources 20a, 20b to an information recording medium 14. On a returning light path from the beam splitter 27b to a light detector 30, there are arranged a focusing/tracking error signal detecting element 26, a detection lens 23, and a pinhole 25 for reducing the inter-layer crosstalk of the information recording medium 14.

The leading end of a shaft 34 of a motor 33 mounted on a bottom surface 35 of a chassis is inserted into a central part of the information recording medium 14. This information recording medium 14 has a construction in which a reflectance reducing portion 19 is provided on the underside of a substrate 9 as described in the sixth embodiment. A light absorbing body 37 as a second reflected-light reducing portion is arranged on a surface facing the information recording medium 14 at the other side of the objective lens 6 with respect to the information recording medium 14.

The light absorbing body 37 has an optical characteristic of reducing reflection of at least a reproducing light transmitting through the information recording medium 14. A construction similar to the light absorbing portion or the reflectance reducing portion described in the foregoing embodiments is adopted as means having a function of the second reflected-light reducing portion. In this embodiment, the light absorbing body 37 containing a light absorbing material having an optical characteristic of absorbing at least the reproducing light such as carbon black described in the first embodiment is formed on the surface facing the information recording medium 14. In FIG. 7, the light absorbing body 37 is formed on the surface of a casing lid 36 of the optical information recording/reproducing apparatus 40, which is opposite to the information recording medium 14. However, the light absorbing body 37 may be provided on a surface of an object facing the information recording medium 14 if the object has another construction.

Since the light absorbing body 37 having the optical characteristic of absorbing the reflected light of at least the reproducing light transmitting through the information recording medium 14 is formed in the optical information recording/reproducing apparatus 40, an excellent SN ratio can be obtained even in the case of using an information recording medium capable of three-dimensional recording. Further, it is preferable that the light absorbing body 37 has an optical characteristic of absorbing a recording light as in the other embodiments.

Since a transmitted light 12 is emitted as a diverging light from the underside of the substrate 9, the light absorbing body 37 is preferably sized such that a dimension thereof along X-axis direction is larger than a reaching range of the diverging light. Further, since the optical pickup unit 38 is moved in (+/−)Y-axis directions depending on a recording/reproducing position at one side of the information recording medium 14 (left half of the information recording medium 14 with respect to the shaft in FIG. 7), a dimension of the light absorbing body 37 along Y-axis direction is preferably sized larger than a moving distance of the optical pickup unit 38.

The light source for recording 20a is a semiconductor pulsed laser source having a pulse width of, for example, from 100 femtoseconds to 10 nanoseconds and a wavelength $\lambda_2$ of 0.78 μm. The light source for reproduction 20b is a semiconductor laser light source having a wavelength $\lambda_1$ of 0.66 μm. The use of such semiconductor laser light sources is preferable for cost reduction. In the nonlinear absorption recording such as the two-photon absorption recording, multiphoton absorption recording or plasma recording, it is easier to obtain a recording light having a large peak power by using a pulsed light source.

Since the size of a recording pit is smaller than that of the usual one-photon absorption recording due to the nonlinear absorption phenomenon (spot diameter in the two-photon absorption recording narrows to 0.7-fold), the recording capacity of the information recording medium 14 is determined by the reproducing light wavelength. Thus, in the case where the wavelength of the light source for reproduction 20b shorter than that of the light source for recording 20a is used, even higher density can be realized. In the two-photon absorption recording, the wavelength of the light source for reproduction 20b is desirably about 0.7-fold of that of the light source for recording 20a.

If a semiconductor laser light source is used, it may be possible that the light source for recording 20a emitting a pulsed light having a large peak power for recording is allowed to function as the light source for reproduction 20b emitting a continuous light having a small peak power. In such a case, the construction can be simpler because the number of parts such as the beam splitter 27a is reduced, but a lower density is realized as compared to a case where separate light sources are used.

The wavelength plate 31 is arranged on a common light path for the recording and reproducing lights from the objective lens 6 to the light sources 20. This wavelength plate 31 is so designed as to become a substantially λ/4 plate or a plate approximate thereto for a recording light 22a and to become a substantially λ/2 plate or a plate approximate thereto for a reproducing light 22b, taking advantage of a wavelength difference. The beam splitter 27a permits the transmission of the recording light 22a while reflecting the reproducing light 22b, also taking advantage of the difference between both wavelengths. Further, the beam splitter 27b is designed to function as a polarization beam splitter for the recording light 22a while functioning as a half mirror hardly dependent on a polarizing direction for the reproducing light 22b, also taking advantage of the difference between both wavelengths.

In the optical information recording/reproducing apparatus 40 of this embodiment, the recording light 22a, which is a linearly polarized beam emitted in Y-axis direction from the light source for recording 20a and also a pulsed laser beam having a relatively large peak power, first passes through the beam splitter 27a as shown in FIG. 7 at the time of the recording. The recording light 22a is substantially collimated by the collimator lens 28, transmits through the beam splitter 27b, which is a beam splitting element, and has its light path bent in (−)Z-axis direction by the deflecting mirror 32. The recording light 22a bent in (−)Z-axis direction is converted into a substantially circular polarized light by the wavelength plate 31, passes through the spherical-aberration correcting element 24, and is irradiated to the information recording medium 14 described in the sixth embodiment of the invention by the objective lens 6 having, for example, a numerical aperture NA of 0.85 and a focal length of 2 mm. The recording light 22a passes the protection layer 4 to be focused on a desired recording layer 1b of a recording portion 3. Rows of the recording pit 5 are recorded in the recording layer 1 using the nonlinear absorption phenomenon such as the two-photon absorption or the multiphoton absorption while a focusing servo and a tracking servo are performed using reflected lights of the recording light 22a.

At this time, since the thickness of the recording portion 3 through which the converged light passes differs depending on the recording depth, the recording pit 5 can be precisely formed if the recording is carried out while an amount of spherical aberration is controlled by the spherical-aberration correcting element 24 provided on the light path from the light sources 20 to the objective lens 6, in accordance with the recording depth of the recording pit 5 in the recording portion 3. The spherical-aberration correcting element 24 used is a liquid crystal element having a variable refractive index distribution, a beam expander in which a concave lens and a convex lens are combined and a distance between both lenses along an optical axis direction is made variable by an actuator, or a micromachine such as a multisegment mirror or a deformable mirror.

Since no metal reflection film is provided between the recording portion 3 and the substrate 9 in the information recording medium 14 of the invention for three-dimensional recording utilizing the two-photon absorption process or the like, part of the recording light 22a transmits through the information recording medium 14 and emits from the underside of the substrate 9 as the transmitted light 12. The transmitted light 12 is reflected by the casing lid 36, and the reflected light partially turns into a stray light upon being incident on the medium again and being detected by the detector 30. However, the transmitted light 12 is incident on the light absorbing body 37 as the second reflected-light reducing portion to be mostly absorbed. Specifically, the light absorbing body 37 having the optical characteristic of absorbing the recording light as well as the reproducing light is provided on the surface facing the information recording medium 14 at the other side of the objective lens 6, thereby reducing an amount of the reflected light returning back when the transmitted light 12 is reflected by the casing lid 36 or the like. Therefore, the reflected light, which turns into the stray light, hardly returns to the light detector 30, with the result that the inclusion of the reflected light into a servo signal during the recording can be prevented and an SN ratio of the servo signal can be improved.

During the reproduction, the reproducing light 22b, which is a linearly polarized laser beam emitted from the light source for reproduction 20b, is bent in Y-axis direction by the beam splitter 27a, likewise is collimated by the collimator lens 28, transmits through the beam splitter 27b, and has its optical path bent in (−)Z-axis direction by the reflecting mirror 32. The reproducing light 22b bent in (−)Z-axis direction passes through the wavelength plate 31 and the spherical-aberration correcting element 24, and is focused on the recording pit 5 in the desired recording layer 1b of the recording portion 3 of the information recording medium 14 by the objective lens 6, keeping in a state of the linearly polarized light.

The light reflected by the recording pit 5 is turned back in an opposite direction, successively passes through the objective lens 6, the spherical-aberration correcting element 24, the wavelength plate 31 and the reflecting mirror 32, has its optical axis bent in Z-axis direction by the beam splitter 27b, and is diverged into a plurality of lights by the diffraction-type focusing/tracking error signal detecting element 26, which are converted into converged lights 29, 29' by the detection lens 23. The converged light 29 to become a reproduced signal light passes through the pinhole 25 to have the signal detected by a tiny light detector 30b. The converged light 29' to become the focusing/tracking error signal is detected by another light detector 30b without passing through the pin hole. A focusing/tracking error signal is detected from the converged light 29' to become the focusing/tracking error signal by a conventional method such as an astigmatism method, an SSD (spot size detection) method or a three-beam tracking method without being passed through the pinhole. In other words, the recording pit is reproduced based on a reflectance difference resulting from a change in the optical constant of the recording layer while the focusing servo and the tracking servo are performed utilizing the reflected light from the desired recording layer 1b.

The focal length of the detection lens 23 is, for example, 33 mm, and the Airy disk diameter of the converged light 29 is, for example, 9.6 μm. The pinhole 25 is arranged substantially at the position of the focal length of the converged light 29. By providing the pinhole 25, crosstalk lights (inter-layer crosstalk), which are unnecessary reflected lights from the rows of the recording pit in the recording layers 1a, 1c, 1d and 1e above and below the desired recording layer 1b, distributes outside the pinhole 25. Since these lights do not enter the pinhole 25, the inter-layer crosstalk lessens. Similar effects can be obtained even when the converged light 29 is detected by the tiny light detector 30a, whose light receiving portion has the size of the pinhole diameter, instead of the pinhole 25.

In this embodiment, in the case where the size of the pinhole 25 is not larger than five times the Airy disk diameter of the converged light 29, the quality of the reproduced signal can be improved to a level which is free from problems even when an interlayer distance of the recording layers 1 (i.e. a thickness of the intermediate layer 2) is of, e.g. 5 to 8 μm (amount of inter-layer crosstalk ≦30 dB). However, in the case where the size of the pinhole 25 is reduced and the interlayer distance of the recording layers 1 is too short, the converged light 29 tends to deviate from the center of the pinhole 25 because an amount of light entering the pinhole 25 decreases or the optical system is distorted due to an environmental temperature. In the case where the light amount decreases, signal intensity can be increased by using an APD (avalanche photodiode). Therefore, the use of the APD is effective when the number of the recording layers 1 is large or the amount of detection light is too small due to a restriction on the material.

During the reproduction, part of the reproducing light 22b transmits through the desired recording layer 1b of the information recording medium 14 and the reflectance reducing portion 19, and emits as the transmitted light 12 from the underside of the substrate 9. Thus, similar to the case of the recording light, the entrance of the reflected light into the light detectors 30 by being reflected by the casing lid 36 or the like can be prevented by providing the light absorbing body 37. As a result, during the reproduction, not only the inclusion of the reflected light into a focusing servo signal and a tracking servo signal can be prevented, but also the SN ratio of the reproduced signal can be improved.

The light absorbing body 37 as the second reflected-light reducing portion preferably has a surface inclined with respect to the optical axis of the reproducing light incident on the medium. Since the optical axis of the principal transmitted light transmitting through the information recording medium 14 without being diffracted or scattered coincides with that of the reproducing light 22b incident on the medium. Thus, in the case where the light absorbing body has the surface inclined with respect to this optical axis, an amount of the reflected light returning the medium again can be reduced, and thereby it is less likely that the reflected light is detected by the light detectors 30.

The construction of the second reflected-light reducing portion is not particularly restricted provided that the reflected light of the recording portion having transmitted through the information recording medium 14 can be reduced by a specified amount. For example, in the case where the light absorbing body having the optical characteristic of absorbing both the recording light and the reproducing light is used as the second reflected-light reducing portion and the wavelengths of the recording light and the reproducing light differ, materials effective for the respective lights may be mixed to construct the light absorbing bodies or the respective light absorbing bodies may be layered.

Although the information recording medium having the reflectance reducing portion provided on the underside of the substrate is used in this embodiment, any one of the information recording mediums according the aforementioned first to fifth embodiments can also be used without any restriction. In such cases, the reflected light from the substrate side of the medium can be reduced if the information recording medium has the first reflected-light reducing portion. Further, when the transmitted lights of the recording light and the reproducing light having transmitted through the recording portion, which will turn into the reflected lights from the substrate side, are absorbed in the first reflected-light reducing portion, the absorbed lights are converted into heat in an absorption area. Accordingly, in the case where an amount of light absorption in the first reflected-light reducing portion is large and there is a possibility of thermal deformation, it is desirable to absorb such an amount of the light as to be free from the possibility of thermal deformation in the first reflected-light reducing portion and to let the rest of the light transmit through the information recording medium to the outside and absorb it in the second reflected-light reducing portion.

Even if the information recording medium 14 is not formed with the first reflected-light reducing portion for reducing the reflected light of the reproducing light from the substrate 9 side, it is advantageous in view of sensitivity to irradiate a light having a relatively large power to the bottommost recording layer (1e in FIG. 7) in a large number of recording layers, upon recording by using the nonlinear absorption phenomenon such as the two-photon absorption or the multiphoton absorption. In this case, the light having a relative large power transmits through the information recording medium 14. Accordingly, the transmitted light 12 transmitting through the information recording medium 14 is absorbed by the second reflected-light reducing portion formed in the optical information recording/reproducing apparatus 40, whereby effects of reducing the reflected light returning to the light detectors 30 by being reflected by a member located on the surface facing the information recording medium 14 such as the casing lid 36 and improving the SN ratios of the signals, can be obtained.

Although the information recording medium and the optical information recording/reproducing apparatus according to the invention are described by way of the first to seventh embodiments above, the invention is not limited to these embodiments and information recording mediums and optical information recording/reproducing apparatuses obtained by combining the constructions of the information recording mediums and the optical information recording/reproducing apparatus described in the respective embodiments are also embraced by the invention and have the same effects. Further, not only recordable information recording media, but also rewritable information recording media are also embraced.

The objective lenses, the collimator lens and the detection lenses used in the foregoing embodiments are named for the sake of convenience, and are same as generally termed lenses.

Further, although the information recording medium has the recording portion only on one surface of the substrate in any one of the foregoing embodiments, the invention is also applicable to information recording mediums having recording portions on the opposite surfaces of a substrate by uniting two substrates each having a recording portion thereon.

Furthermore, although the optical disk is taken as an example of the information recording medium in the foregoing embodiment, the application to card-shaped, drum-shaped and tape-shaped products designed such that reproduction from the media of a plurality of different specifications such as thickness and recording density is possible in a similar optical information recording/reproducing apparatus is also embraced by the scope of the invention.

As described above, one aspect of the invention is directed to an information recording medium comprising a substrate, a recording portion formed on the substrate and having a recording layer, and a first reflected-light reducing portion for reducing a reflected light of a reproducing light from a substrate side, wherein a recording pit is capable of three-dimensionally recording a recording pit by changing an optical constant of the recording layer by an irradiation of a recording light, and the first reflected-light reducing portion is formed at a side opposite to an incident side of the reproducing light with respect to the recording portion.

According to this information recording medium, even in the information recording medium which, unlike conventional optical disks, has no metal reflection film provided between the recording portion and the substrate and has small amount of the reflected light from the recording pit for three-dimensional recording, a stray light resulting from the reflected light of the reproducing light from the substrate side can be sufficiently reduced, wherefore a reproduced signal having a good SN ratio can be obtained from the lower recording layer without largely increasing the reflectance of the recording layer.

The first reflected-light reducing portion is preferably a light absorbing portion having an optical characteristic of absorbing the reproducing light.

By using the light absorbing portion having the optical characteristic of absorbing the wavelength of the reproducing light as the first reflected-light reducing portion, the reflected light can be sufficiently reduced since the reproducing light is absorbed in the medium.

The first reflected-light reducing portion is preferably a reflectance reducing portion having an optical characteristic of reducing the reflectance of the reproducing light.

By using the reflectance reducing portion having the optical characteristic of reducing the reflectance of the reproducing light is used as the first reflected-light reducing portion, the reflectance of the reproducing light at a substrate side of the medium is reduced, wherefore the reflected light can be sufficiently reduced.

The substrate may act as the light absorbing portion.

According to the above feature, the reflected light of the reproducing light from the underside of the substrate can be sufficiently reduced.

The light absorbing portion may be a light absorbing layer formed between the substrate and the recording portion.

According to the above feature, the reflected light of the reproducing light created at the underside of the substrate and at an interface between the substrate and the recording portion can be reduced.

The light absorbing portion may be a light absorbing layer formed at a side opposite to the incident side of the reproducing light with respect to the substrate.

According to the above feature, the reflected light of the reproducing light at the underside of the substrate can be sufficiently reduced.

As the recording portion, for example, a recording portion, in which recording layers and intermediate layers are alternately laminated, can be used.

Since the first reflected-light reducing portion is formed in the medium, sufficient SN ratios can be ensured even if the information recording medium has a large number of recording layers for three-dimensional recording.

As the recording portion, for example, a recording portion entirely constituting a recording layer may be used.

According to the above recording portion having such a construction, the reflection at interfaces between the recording layers and the intermediate layers can be prevented and the production is easier.

It is preferred that the first reflected-light reducing portion additionally has an optical characteristic of reducing the reflected light of the recording light from the substrate side.

According to the above feature, the inclusion of the reflected lights of the recording light from the substrate side into tracking error signals can be suppressed also during the recording.

Further, a protection layer is preferably provided at an incident side of the reproducing light with respect to the recording portion.

According to the above feature, the influence of dust and dirt on the outer surface of the medium can be reduced.

It is preferred that the recording layer has no tracking guide grooves and a tracking guide layer is provided between the substrate and the recording portion.

According to the above feature, reflected and diffracted lights by the concavity and convexity of the tracking guide grooves can be prevented since the recording layer has no tracking guide groove.

It is preferred that the recording layer has no tracking guide grooves, a tracking guide layer is provided between the substrate and the recording portion, and the light absorbing layer has an optical characteristic of permitting the transmission of a tracking-guide irradiating light and a tracking-guide reflected light.

According to the above feature, since the transmitted light of the reproducing light having transmitted through the recording pit is attenuated before being incident on the substrate, the reflected light of the reproducing light from the substrate can be reduced. Further, part of the transmitted light having transmitted through the light absorbing layer is reflected by the underside of the substrate and the reflected light is absorbed in the light absorbing layer before entering the recording portion again. Furthermore, reflected and diffracted lights by the convexity and concavity of the tracking guide grooves can be prevented. Moreover, since the light absorbing layer has a function of permitting the transmission of the tracking-guide irradiating light and the tracking-guide reflected light, the detection of the tracking guide grooves is not hindered.

The light absorbing portion preferably contains a light absorbing material having an optical characteristic of absorbing the reproducing light or a mixture of the light absorbing material and a resin.

According to the above feature, the light absorbing portion can be easily produced.

The resin is preferably at least one kind selected from polycarbonates, PMMAs, norbornen resins, and cycloolefin resins.

According to the above feature, the light absorbing portion containing the light absorbing material can be easily produced.

The light absorbing material is preferably at least one kind selected from carbon materials, organic coloring agents, dyes, pigments and semiconductor particles.

According to the above feature, the reflected light can be sufficiently reduced since the light absorbing portion contains the light absorbing material having an excellent light absorbing performance.

The first reflected-light reducing portion preferably includes both the light absorbing portion having the optical characteristic of absorbing the reproducing light and the reflectance reducing portion having the optical characteristic of reducing the reflectance of the reproducing light.

In the case where the first reflected-light reducing portion includes both the light absorbing portion and the reflectance reducing portion, the reflected light of the reproducing light from the substrate side can be further reduced.

The reflectance reducing portion is preferably provided at an incident side of the reproducing light with respect to the light absorbing portion.

According to the above feature, reflection at the interface between the recording portion and the substrate can also be reduced when the reproducing light is incident on the substrate after transmitting through the recording pit.

The reflectance reducing portion preferably includes a dielectric film or a diffractive optical element having a sub-wavelength structure.

According to the above feature the reflected light of the reproducing light from the substrate side can be sufficiently reduced since the reflectance of the reproducing light can be sufficiently reduced.

The reflectance reducing portion is preferably formed at a side opposite to the incident side of the reproducing light with respect to the substrate.

According to the above feature, the reflected light of the reproducing light at the underside of the substrate can be reduced.

The recording layer preferably contains one kind of recording material selected from photopolymers, diarylethene and its derivatives.

According to the above feature, a higher recording density can be realized since the recording pit is recorded in the recording layer utilizing the two-photon absorption process.

The recording layer preferably further contains a resin substantially transparent to the recording light and the reproducing light.

According to the above feature, the light can sufficiently reach up to the bottommost layer even if the recording portion has a large number of recording layers.

The recording layer preferably contains a fluorescent material for emitting a light of a wavelength for exposing the recording material upon being irradiated with the recording light.

According to the above feature, the recording material having an excellent one-photon absorption sensitivity is exposed to light in the one-photon absorption process by the two-photon fluorescence since the fluorescent material has a high recording sensitivity in the two-photon absorption process.

The optical constant is preferably a refractive index.

According to the above feature, it is suitable for an information recording medium having a multilayer structure since a change in the refractive index of the recording layer results in less light loss than an absorption change.

Since the influence of the stray light is reduced in the information recording medium, the recording capacity by the two-photon absorption recording can be increased.

Another aspect of the invention is directed to an optical information recording/reproducing apparatus for recording information to and reproducing information from an information recording medium including a recording portion capable of three-dimensionally recording a recording pit by changing an optical constant of a recording layer, comprising a light source for emitting a recording light, a light source for emitting a reproducing light, an objective lens for focusing the recording light and the reproducing light emitted from the light sources on the information recording medium, a light detector for detecting the light reflected by the information recording medium, and a second reflected-light reducing portion for reducing the reflected light of the reproducing light transmitting through the information recording medium provided on a surface facing the information recording medium at the other side of the objective lens.

According to the optical information recording/reproducing apparatus, the transmitted light of the reproducing light having transmitted through the medium emits to the apparatus since the information recording medium has no metal reflection film between the recording portion and a substrate for three-dimensional recording. However, since the second reflected-light reducing portion is provided on the surface of the apparatus facing the medium, the reflection of the transmitted light can be reduced and the reflected light returning to the medium can be reduced, thereby obtaining a satisfactory SN ratio.

The information recording medium preferably has a first reflected-light reducing portion for reducing the reflected light of the reproducing light from the substrate side provided at a side opposite to an incident side of the reproducing light with respect to the recording portion.

According to the above feature, the reflected light in the medium can be reduced and the reflected light of the transmitted light can be reduced in the apparatus since the medium includes the first reflected-light reducing portion, wherefore the SN ratios can be further improved.

The second reflected-light reducing portion preferably has a surface inclined with respect to an optical axis of the reproducing light emitted from the light source and incident on the information recording medium.

According to the above feature, the reincidence on the medium can be prevented even if there is any reflected light.

The second reflected-light reducing portion is preferably a light absorbing body having an optical characteristic of absorbing at least the reproducing light.

According to the above feature, the reflected light that will enter the medium again can be reduced since the transmitted light of the reproducing light having transmitted through the medium is absorbed by the light absorbing body.

The light source for the recording is preferably a semiconductor laser light source for emitting a pulsed beam whose pulse width is from 100 femtoseconds to 10 nanoseconds.

According to the above feature, a recording light having a large peak power can be obtained.

The recording in the recording layer is preferably made by two-photon absorption recording.

According to the above feature, information can be three-dimensionally recorded in the recording portion having a large number of recording layers.

The present application claims the priority based on Japanese Patent Application 2004-330211 filed on Nov. 15, 2004, and the contents of which are herein incorporated by reference.

According to the inventive information recording medium and optical information recording/reproducing apparatus, a stray light from a portion other than the recording pit, which turns into a noise light, can be reduced. Therefore, the invention is applicable to information recording mediums and optical information recording/reproducing apparatuses capable of three-dimensional recording.

The invention claimed is:

1. An information recording medium, comprising:
   a substrate,
   a recording portion disposed on the substrate and including a recording layer, the recording layer having an optical constant, and
   a first reflected-light reducing portion for reducing reflected light of a reproducing light from a substrate side,
   wherein the recording portion is capable of three-dimensionally recording a recording pit by changing the optical constant of the recording layer by an irradiation of recording light,
   the first reflected-light reducing portion is disposed at a side opposite to an incident side of the reproducing light with respect to the recording portion, and
   the recording layer has no tracking guide grooves, and a tracking guide layer is disposed between the substrate and the recording portion.

2. An information recording medium according to claim 1, wherein the first reflected-light reducing portion includes a light absorbing portion having an optical characteristic of absorbing the reproducing light.

3. An information recording medium according to claim 1, wherein the first reflected-light reducing portion includes a reflectance reducing portion having an optical characteristic of reducing a reflectance of the reproducing light.

4. An information recording medium according to claim 2, wherein the substrate acts as the light absorbing portion.

5. An information recording medium according to claim 2, wherein the light absorbing portion includes a light absorbing layer formed between the substrate and the recording portion.

6. An information recording medium according to claim 2, wherein the light absorbing portion includes a light absorbing layer formed at a side opposite to an incident side of the reproducing light with respect to the substrate.

7. An information recording medium according to claim 1, wherein the recording portion has a multilayer structure in which recording layers and intermediate layers are alternately laminated.

8. An information recording medium according to claim 1, wherein the entire recording portion constitutes one recording layer.

9. An information recording medium according to claim 1, wherein the first reflected-light reducing portion has an optical characteristic of reducing reflected light of the recording light from the substrate side.

10. An information recording medium according to claim 1, further comprising a protection layer at an incident side of the reproducing light with respect to the recording portion.

11. An information recording medium according to claim 5, wherein, the recording layer has no tracking guide grooves, a tracking guide layer is disposed between the light absorbing layer and the substrate, and the light absorbing layer has an optical characteristic of permitting the transmission of a tracking-guide irradiating light and a tracking-guide reflected light.

12. An information recording medium according to claim 2, wherein, the light absorbing portion contains a light absorbing material having an optical characteristic of absorbing the reproducing light or a mixture of the light absorbing material and a resin.

13. An information recording medium according to claim 12, wherein the resin is at least one kind selected from polycarbonates, PMMAs, norbornen resins and cycloolefin resins.

14. An information recording medium according to claim 12, wherein the light absorbing material is at least one kind selected from carbon materials, organic coloring agents, dyes, pigments and semiconductor particles.

15. An information recording medium according to claim 1, wherein the first reflected-light reducing portion includes both a light absorbing portion having an optical characteristic of absorbing the reproducing light and a reflectance reducing portion having an optical characteristic of reducing reflectance of the reproducing light.

16. An information recording medium according to claim 15, wherein the reflectance reducing portion is disposed at an incident side of the reproducing light with respect to the light absorbing portion.

17. An information recording medium according to claim 3, wherein the reflectance reducing portion includes a dielectric film or a diffractive optical element having a sub-wavelength structure.

18. An information recording medium according to claim 3, wherein the reflectance reducing portion is formed at a side opposite to an incident side of the reproducing light with respect to the substrate.

19. An information recording medium according to claim 1, wherein the recording layer contains one kind of recording material selected from photopolymers, diarylethene and its derivatives.

20. An information recording medium according to claim 19, wherein the recording layer further contains a resin substantially transparent to the recording light and the reproducing light.

21. An information recording medium according to claim 19, wherein the recording layer contains a fluorescent material for emitting light of a wavelength for exposing the recording material upon being irradiated with the recording light.

22. An information recording medium according to claim 1, wherein the optical constant is a refractive index.

23. An information recording medium according to claim 1, wherein the recording in the recording layer is made by two-photon absorption.

24. An optical information recording/reproducing apparatus for recording information to and reproducing information from the information recording medium according to claim 1, comprising:
- a light source for emitting recording light,
- a light source for emitting reproducing light,
- an objective lens for focusing the recording light and the reproducing light emitted from the light sources on the information recording medium,
- a light detector for detecting light reflected by the information recording medium, and
- a second reflected-light reducing portion for reducing reflected light of the reproducing light transmitting through the information recording medium provided on a surface facing the information recording medium at the other side of the objective lens.

25. An optical information recording/reproducing apparatus according to claim 24, wherein the information recording medium has a first reflected-light reducing portion for reducing reflected light of the reproducing light from a substrate side provided at a side opposite to an incident side of the reproducing light with respect to the recording portion.

26. An optical information recording/reproducing apparatus according to claim 24, wherein the second reflected-light reducing portion has a surface inclined with respect to an optical axis of the reproducing light emitted from the light source and incident on the information recording medium.

27. An optical information recording/reproducing apparatus according to claim 24, wherein the second reflected-light reducing portion includes a light absorbing body having an optical characteristic of absorbing at least the reproducing light.

28. An optical information recording/reproducing apparatus according to claim 24, wherein the recording in the recording layer is carried out with a semiconductor laser light source for emitting a pulsed beam whose pulse width is from 100 femtoseconds to 10 nanoseconds.

29. An optical information recording/reproducing apparatus according to claim 24, the recording in the recording layer is made by two-photon absorption.

* * * * *